United States Patent
Kim et al.

(10) Patent No.: US 10,931,422 B2
(45) Date of Patent: Feb. 23, 2021

(54) TRANSMITTING DOWNLINK REFERENCE SIGNALS TO USER EQUIPMENTS (UES)

(71) Applicant: Intel Corporation, Santa Clara, CA (US)

(72) Inventors: Joonbeom Kim, San Jose, CA (US); Kathiravetpillai Sivanesan, Portland, OR (US); Vesh Raj Sharma Banjade, Hillsboro, OR (US); Yaser Fouad, North Plains, OR (US); Balkan Kecicioglu, Hillsboro, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 4 days.

(21) Appl. No.: 15/746,776

(22) PCT Filed: Dec. 24, 2015

(86) PCT No.: PCT/US2015/000354
§ 371 (c)(1),
(2) Date: Jan. 22, 2018

(87) PCT Pub. No.: WO2017/018969
PCT Pub. Date: Feb. 2, 2017

(65) Prior Publication Data
US 2018/0219662 A1    Aug. 2, 2018

Related U.S. Application Data

(60) Provisional application No. 62/197,332, filed on Jul. 27, 2015.

(51) Int. Cl.
*H04L 5/00* (2006.01)
*H04W 72/04* (2009.01)
*H04L 25/02* (2006.01)

(52) U.S. Cl.
CPC ............ *H04L 5/0051* (2013.01); *H04L 5/005* (2013.01); *H04W 72/044* (2013.01);
(Continued)

(58) Field of Classification Search
CPC .......... H04W 72/042; H04W 56/0045; H04W 56/001; H04W 56/0005
See application file for complete search history.

(56) References Cited

U.S. PATENT DOCUMENTS

2012/0207126 A1    8/2012  Qu et al.
2014/0044054 A1*   2/2014  Kim .................. H04W 72/0453
                                                          370/329

(Continued)

FOREIGN PATENT DOCUMENTS

CN          101272372 A       9/2008
CN          101674119 A       3/2010
(Continued)

OTHER PUBLICATIONS

3GPP TR 45.820; "3$^{rd}$ Generation Partnership Project; Technical Specification Group GSM/EDGE Radio Access Network; Cellular System Support for Ultra Low complexity and Low Throughput Internet of Things"; (May 2015); 162 pages; V1.2.1 (Release 13).

(Continued)

*Primary Examiner* — Jung H Park
(74) *Attorney, Agent, or Firm* — Alliance IP, LLC

(57) ABSTRACT

Technology for a base station operable to transmit downlink reference signals to user equipments (UEs) is disclosed. The base station can identify a UE to receive a set of pre-configured downlink reference signals from the base station. The set of pre-configured downlink reference signals can include a set of pre-configured pilot symbols in accordance with a defined reference signal transmission pattern that is characterized by a first pilot symbol spacing parameter ($N_t$)

(Continued)

in a subcarrier time domain and a second pilot symbol spacing parameter ($N_f$) in a subcarrier frequency domain. The base station can transmit to the UE the set of pre-configured downlink reference signals in accordance with the defined reference signal transmission pattern. The UE can be configured to detect the set of pre-configured downlink reference signals and perform a channel estimation based on the set of pre-configured downlink reference signals.

15 Claims, 9 Drawing Sheets

(52) U.S. Cl.
CPC ......... *H04W 72/048* (2013.01); *H04L 5/0069* (2013.01); *H04L 5/0073* (2013.01); *H04L 25/0232* (2013.01)

(56) References Cited

U.S. PATENT DOCUMENTS

| | | | |
|---|---|---|---|
| 2018/0270008 A1* | 9/2018 | Yi | H04J 11/0069 |
| 2018/0270803 A1* | 9/2018 | Kwak | H04W 56/00 |
| 2019/0044690 A1* | 2/2019 | Yi | H04L 5/14 |

FOREIGN PATENT DOCUMENTS

| | | |
|---|---|---|
| CN | 102917371 A | 2/2013 |
| CN | 103124210 A | 5/2013 |
| WO | WO 2014088185 A1 | 6/2014 |

OTHER PUBLICATIONS

Intel Corporation; "EC-GSM—Link-Level Performance of EC-PCH"; 3GPP TSG GP-150407; (May 25-29, 2015); 7 pages; GERAN Meeting #66, Vilnius, Lithuania; Agenda 7.1.5.3.5.

Vodafone Group PLC.; "New Study Item on Cellular System Support for Ultra Low Complexity and Low Throughput Internet of Things"; 3GPP TSG GP-140421; (May 26-30, 2014); 6 pages; GERAN Meeting #62, Valencia, Spain; rev of GP-140418 rev of GP-140411; Agenda 11.1.

Ye et al.; "Pilot-Symbol-Aided Channel Estimation for OFDM in Wireless Systems"; IEEE Transactions on Vehicular Technology; (Jul. 2000); pp. 1207-1215; vol. 49, No. 4.

International Preliminary Report on Patentability dated Jan. 30, 2018, in International Application No. PCT/US2015/000354, filed Dec. 24, 2015; 7 pages.

EPO; Office Action issued in EP Patent Application No. 15828792.0, dated Jun. 5, 2020; 9 pages.

QUALCOMM Incorporated, et al.; "NB-CIOT—Downlink Physical Layer Design," SGPP TSG GERAN; Jun. 24, 2015; 13 pages.

SIPO; First Office Action issued in CN Patent Application No. 201580081228.0, dated May 12, 2020; 18 pages including English translation available.

* cited by examiner

TRANSMITTING DOWNLINK REFERENCE SIGNALS TO USER EQUIPMENTS (UES)

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
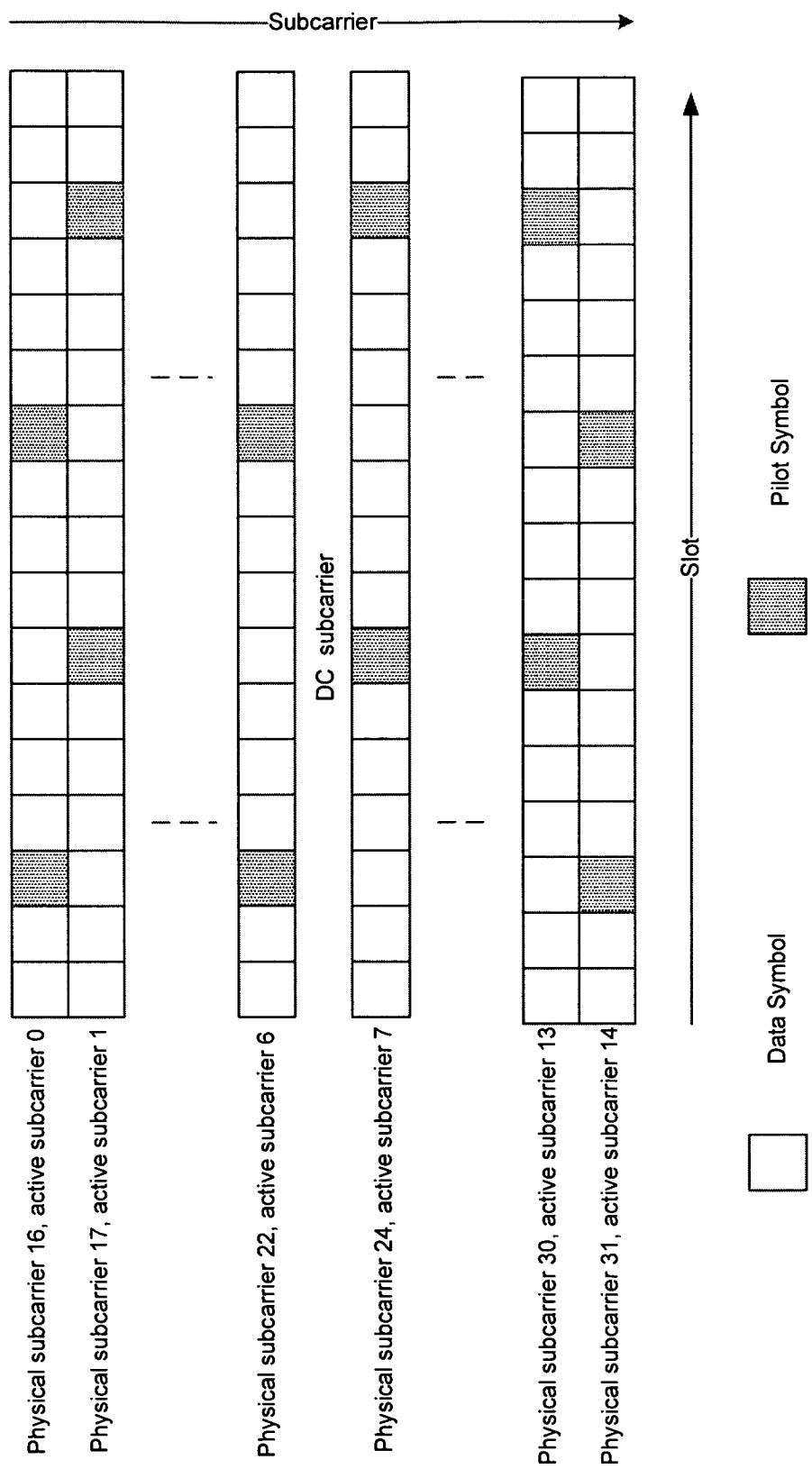
FIG. 1 illustrates a legacy downlink reference signal pattern in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In upcoming years, cellular Internet of Things (CIoT) devices or machine type communication (MTC) devices are expected to be a growing area in the field of wireless communications. CIoT devices generally communicate (i.e., send or receive) small amounts of data to the network. The small amount of data typically ranges from a few bits to kilobits of data. As non-limiting examples, CIoT devices can include smart meters, health monitoring devices, sensors, etc. Unlike cellular technologies that generally involve high data rate services (e.g., voice, video), CIoT technology is expected to support a relatively large number of CIoT devices, but with much smaller data rates as compared to cellular devices. In addition, the relatively large numbers of CIoT devices are expected to support coverage enhancements to enable communication even when deployed inside buildings. Since CIoT devices are envisioned to last up to ten years without battery replacement, efficient power management is of importance to CIoT devices.

A wireless channel can be inherently time selective, and an update rate of the wireless channel can depend on a mobility level of a mobile device (e.g., a CIoT device) and/or a deployment environment associated with the mobile device. The mobile device can, in general, perform coherent detection of transmitted signals over the wireless channel based on reference signals to obtain channel knowledge, and therefore, the mobile device can continuously track and update the channel parameters. In one approach, unknown wireless channel parameters can be estimated by using reference signals (or pilot symbols) that are inserted between the desired data signals, such that a receiver of the mobile device is able to track the channel parameters. In addition, knowledge of wireless channel characteristics can enable the mobile device or eNodeB to determine a ratio of reference signals to transmitted data signals.

In one example, an approach for tracking the channel parameters can be referred to as pilot-symbol assisted modulation (PSAM). Channel estimators with PSAM are widely used in current commercial wireless systems, e.g., 3G and 4G LTE systems, due to its simplicity and mean squared error optimality. The channel estimator can be implemented with respect to OFDM signals, which are two dimensional signals that operate in a time domain and a frequency domain. Alternatively, the channel estimation can be implemented in the time domain and then the frequency domain, or vice versa.

In one example, a complex representation of an impulse response of the wireless channel is given by:

$$h(t, \tau) = \sum_{k=0}^{L-1} c_k(t)\delta(\tau - \tau_k)$$

wherein L is a number of multipaths of wireless channels, $\tau_k$ is a delay of the kth path, and $c_k(t)$ is a corresponding complex amplitude. The magnitude, $c_k(t)$, ∀ k can be modeled as an independent, wide-sense stationary, narrow-band complex Gaussian process with an average power of $\sigma_k^2$. Equivalently, the frequency response of the wireless channel at time t can be expressed as:

$$H(t, f) = \sum_{k=0}^{L-1} c_k(t)e^{-j2\pi f \tau_k}.$$

In one example, with respect to an OFDM based communication system and assuming a quasi-static wireless channel with relatively small variations over an OFDM symbol period, a discrete spaced-time spaced-frequency correlation function of a channel frequency response for a time shift of n symbols and frequency shift of k subcarriers can be expressed as:

$$r_H(n,k) = r_t(n) \cdot r_f(k)$$

wherein:

$$r_t(n) = J_0(2\pi f_{d,max} T_s n)$$

$$r_f(k) = \sum_{l=0}^{L-1} \sigma_l^2 e^{-j2\pi k \Delta f T l}$$

and wherein $T_s = (N+L)T$ is an OFDM symbol duration including a cyclic prefix, N is a number of available subcarriers in the OFDM symbol, $f_{d,max}$ is a maximum Doppler frequency, $J_0(\cdot)$ is a zeroth-order Bessel function of a first kind, and $\Delta f$ is a subcarrier spacing. Here, $r_t(n)$ is a correlation at the time domain, and $r_f(k)$ is a correlation at the frequency domain and is a function of a channel delay profile. As indicated, the coherence time and coherence bandwidth of the wireless channel are functions of the maximum Doppler frequency and the channel delay profile, respectively.

In one example, reference signal resources can be inserted into data signal resources to aid the channel estimation process in both time and frequency domains in a lattice structure. The density of such reference signal resources can be selected based on the wireless channel characteristics described above.

In one example, there are two alternative designs for reference signals in current wireless communication systems: (1) cell-specific common reference signals; and (2) user-specific reference signals. With respect to (1), the reference signal specific to a cell can be broadcasted to all mobile devices from the cell for measurements, channel estimation, and frequency tracking. With respect to (2), the reference signal can be dedicated to particular mobile devices and can be modulated with device-specific beamforming. Consequently, due to limited radio resources, cell-specific reference signals can be better suited to systems deploying a large number of mobile devices (e.g., CIoT devices). In other words, user-specific reference signals can be undesirable due to the large number of CIoT devices in the cellular network. The amount of resources utilized for the user-specific reference signals can exceed the network's capability.

FIG. 1 illustrates an example of a legacy downlink reference signal pattern. More specifically, the legacy downlink reference pattern is a cell-specific reference signal pattern utilized for coherent detection at a receiver, such as a mobile device. As shown in FIG. 1, reference signals (or pilot symbols) are inserted in every subcarrier. Each subcarrier can include a slot, and the slot can include 17 symbols, which can consist of data symbols or pilot symbols in the time domain. As an example, the reference signals (or pilot symbols) are inserted in active subcarrier 0, active subcarrier 1, active subcarrier 2, and so on. In addition, a base station can assign one, two, or four subcarriers to send data signals to the mobile devices, thus allowing the mobile devices to estimate the channel based on the assignment. However, in order to meet the low computational complexity restrictions of CIoT devices, the previous solution of transmitting the reference signals (or pilot symbols) in every subcarrier may not be feasible with respect to CIoT devices. The redundancy of reference signals can degrade the throughput for the CIoT device. In addition, the commonality of the reference signals can make transmitting the reference signals in every subcarrier unduly burdensome.

Moreover, the legacy downlink reference pattern illustrated in FIG. 1 can present several drawbacks. For example, as previously described, the reference signal pattern can be designed based on the wireless channel characteristics between the base station and the mobile device. In the pilot symbol pattern shown in FIG. 1, the number of reference signals (or pilot symbols) can be more than necessary for slow moving mobile devices.

In one example, a PSAM channel estimator utilizes a two-dimensional Nyquist sampling theorem in OFDM systems, as given by:

$$N_t < 1/(2f_{d,max}T_s)$$
$$N_f < N/L$$, wherein $N_t$ and $N_f$ are the allowed number of data samples between two reference signals (or two pilot symbols) in the time and frequency domains, respectively. In addition, $f_{d,max}$ is a maximum Doppler frequency, $T_s = (N+L)T$ is the OFDM symbol duration including the cyclic prefix, L is the number of multipaths of wireless channels, and N is the number of available subcarriers in the OFDM symbol. Based on the 2D Nyquist sampling theorem, the number of data symbols allowed between the pilot symbols is based on the Nyquist sampling theorem, which is given by the equations above. Hence, $N_t$ can refer to a time domain separation between the reference signals (or pilot symbols), and $N_f$ can refer to the frequency domain separation between the reference signals (or pilot symbols).

Since the cell specific reference signals use dedicated resources, which are independent of the load on the network, the pilot symbol pattern is to be designed to optimize spectral efficiency. Since CIoT devices can estimate their channels based on broadcasted reference signals in a cell-specific manner, these CIoT devices can also make use of pilot symbols outside of their allocated resources and employ interpolation. Therefore, the reference signals (or pilot symbols) do not have to be transmitted on every subcarrier, thereby improving the spectral efficiency.

Another drawback of the pilot symbol pattern shown in FIG. 1 is that the pilot symbol patterns are independent of the mobile devices' channel characteristics and throughput. However, unlike existing wireless systems that may target higher data traffic services, the wireless systems for CIoT devices are expected to service a large number of CIoT devices simultaneously. As a result, these wireless system architectures are to be appropriately designed to accommodate throughput conditions of the CIoT devices, e.g., short/sparse data transmissions. Furthermore, some classes of CIoT devices, especially coverage extended users, may necessitate blind repetitions or spreading to be able to effectively reach the base station. Such classes of CIoT devices are expected to consume more resources as compared to other classes experiencing normal coverage (i.e. non-extended coverage), thus resulting in greater power consumption for these classes of CIoT devices. Consequently, to reduce the power consumption and manage resources in an efficient manner, a dynamic reference signal pattern (or dynamic pilot symbol pattern) to serve the CIoT devices operating under various coverage classes is well motivated.

In the present technology, cell specific reference signals can be transmitted via wireless channels on downlink (DL) to mobile devices (e.g., CIoT devices), and the mobile devices can utilize the cell specific reference signals to perform channel estimation. The transmission of the reference signals can involve transmitting pilot symbols to the mobile device. Since the reference signals (or pilot symbols) use dedicated resources, the optimization of spectral efficiency is critical. CIoT technology is targeted to support a large number of mobile devices, so efficient use of resources is critical to provide the mobile devices with quick access to the network. Since the wireless channels on assigned slots can be estimated from cell-specific reference signals either on the assigned resources or outside of the user's allocated resources, in the pilot symbol pattern in accordance with the present technology, the pilot symbol density can be reduced as compared to previous pilot symbol solutions by more sparsely transmitting reference signals on dispersed subcarriers. As a result, improved spectral efficiency and flexibility can be achieved while maintaining a comparable error performance. The improved spectral efficiency can lead to a longer battery life for the mobile device. In one example, the present technology describes a pilot symbol pattern that can be utilized for downlink narrow band OFDMA with respect to CIoT devices.

Moreover, depending on the coverage class of the mobile devices and their mobility levels, different pilot symbol patterns can be used for different coverage classes. In other words, mobile devices in the same coverage class or associated with a same mobility level can each read the same pilot symbol pattern, which corresponds to the appropriate coverage class or mobility level. In addition, the reference signals (or pilot symbols) can be broadcasted to the mobile devices in accordance with a pattern that is constructed using TDM or FDM.

In one configuration, a static sparse reference signal (or pilot symbol) pattern can be provided with improved spectral efficiency, as compared to previous pilot symbol patterns. The improved spectral efficiency can be achieved by a more sparse pattern of reference signals (or pilot symbols), especially in scenarios implementing cell-specific reference signals.

For example, the reference signals (or pilot symbols) can be inserted into every $N_f$ subcarrier, rather than every subcarrier as in previous pilot symbol patterns. As previously described, $N_f$ is the allowed number of data samples between two reference signals (or two pilot symbols) in the frequency domain. In one example, $N_f$ can be dependent on a channel delay profile. In other words, a reference signal (or pilot symbol) spacing in the frequency domain can be dependent on a coherence bandwidth, $B_C$, i.e., the frequency range in which a channel impulse response is almost flat. The coherence bandwidth is approximately inversely proportional to a delay spread of the wireless channels.

Figure 2:
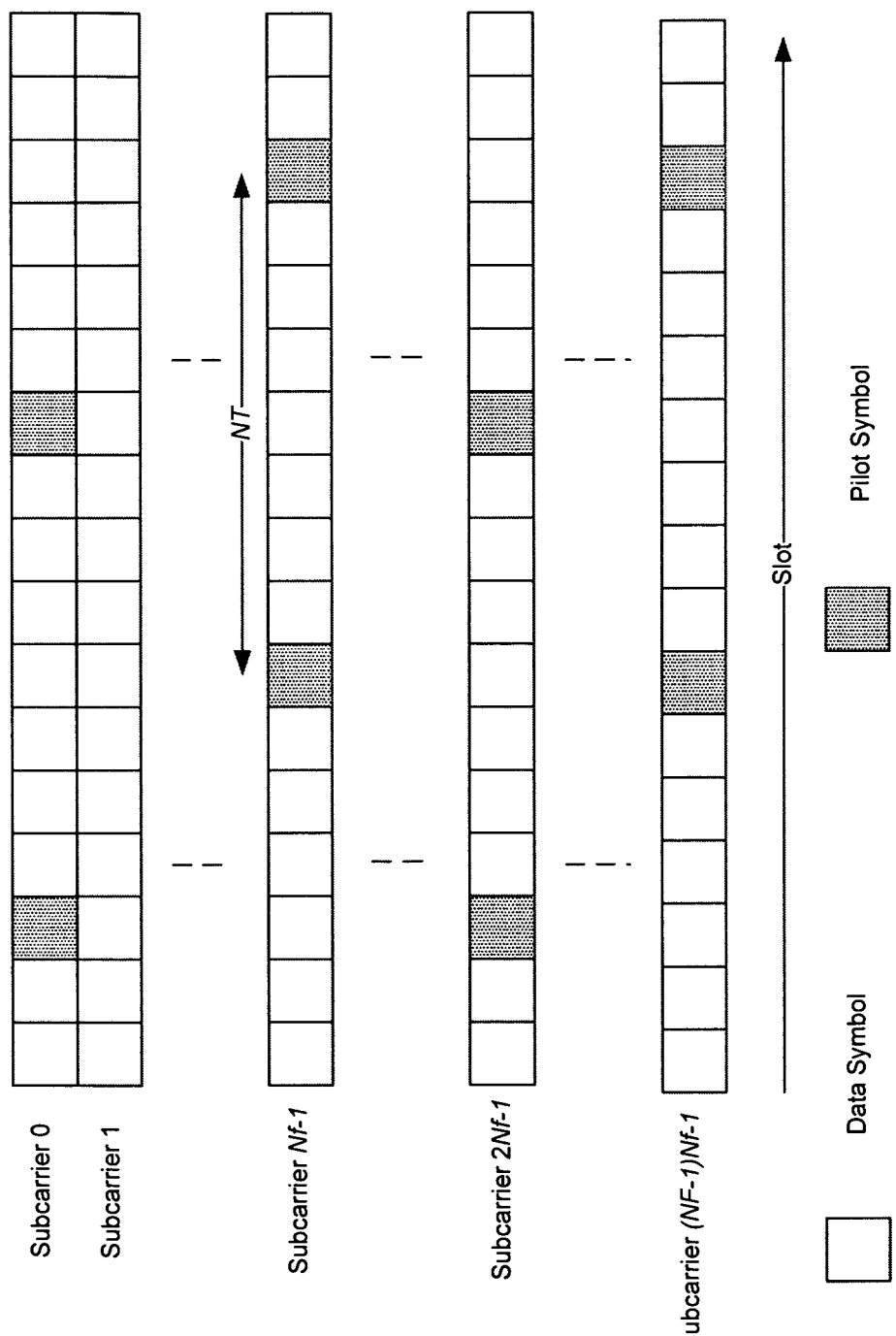
FIG. 2 illustrates a pre-configured downlink reference signal pattern in accordance with an example.

FIG. 2 illustrates an exemplary pre-configured downlink reference signal pattern. The pattern of reference signals (or pilot symbols) can be received at a user equipment (UE) via a wireless channel, such as a cellular Internet of Things (CIoT) device, and the UE can utilize the reference signals to perform a channel estimation of the wireless channel. A base station can assign one, two of four subcarriers to send reference signals (or pilot symbols) to the UE for purposes of channel estimation. In the pattern, the reference signals (or pilot symbols) may not be inserted in every subcarrier. Rather, reference signals (or pilot symbols) can be inserted every $N_f$ subcarriers, and within a particular subcarrier, a reference signal (or pilot signal) can be inserted every $N_t$ symbols. Here, $N_t$ and $N_f$ are the allowed number of data samples between two reference signals (or two pilot symbols) in the time and frequency domains, respectively. The subcarrier can include a slot, and the slot can include 17 symbols, which can consist of data symbols or pilot symbols in the time domain.

In one example, the pilot symbol spacing parameters of $N_t$ and $N_f$ can be configured based on a number of usable subcarriers of an OFDM symbol, wireless channel characteristics, and an expected mobility of the UE. In other words, $N_t$ and $N_f$ are configurable parameters that can vary depending on the various factors described above.

In the example shown in FIG. 2, the $3^{rd}$ and $11^{th}$ symbols are reference signals (or pilot symbols) in subcarrier 0. Since there are 7 data symbols between the first pilot symbol (i.e., the $3^{rd}$ symbol) and the second pilot symbol (i.e., the $11^{th}$ symbol) in the time domain, in this example, $N_t$ is equal to 7. In addition, in this example, subcarrier 1 does not include any pilot symbols. Rather, the subsequent subcarrier with one or more pilot symbols is subcarrier $N_f-1$, wherein $N_f$ represents a pilot symbol spacing in the frequency domain. In subcarrier $N_f-1$, the $7^{th}$ and $15^{th}$ symbols are reference signals (or pilot symbols). Similar to subcarrier 0, $N_t$ for subcarrier $N_f-1$ can also be 7. The subsequent subcarrier with one or more pilot symbols is subcarrier $2N_f-1$. Here, similar to subcarrier 0, the pilot symbols can be inserted in symbols 3 and 11, respectively. Moreover, a subsequent subcarrier with one or more pilot symbols is $(N_F-1)N_f-1$, where $N_F$ is the number of subcarriers with pilot symbols. Here, similar to subcarrier $N_f-1$ (in case where $N_F$ is an even number), the pilot symbols can be inserted in symbols 7 and 15, respectively. Thus, although the subcarriers can include one or more pilot symbols, the insertion of the pilot symbols in the slots can be staggered, as shown in FIG. 2.

Moreover, in the example shown in FIG. 2, the base station can assign $N_F$ subcarriers on the same symbols for the CIoT device to utilize for channel estimation In one example, pilot data from one or more pilot symbols of a particular subcarrier can be utilized in subsequent subcarriers. For example, as the same pilot data symbols from subcarrier 0 can be reused in subcarrier $N_f-1$, the computational complexity of channel estimators at the CIoT device can be reduced.

In one example, by reducing the density of subcarriers that include one or more pilot symbols, spectral efficiency can be improved, especially with respect to CIoT devices that are generally characterized by low mobility and short/sparse data transmissions. In addition, reducing the number of symbols that include pilot symbols can increase data throughput because these symbols can be instead utilized for data symbols. In other words, instead of inserting redundant pilot symbols, these symbols in the subcarrier can be used for data transmissions.

In one example, CIoT devices generally perform sporadic and sparse data transmissions, so the number of reference signals (or pilot symbols) can be reduced as compared to LTE systems, in which additional pilot symbols are useful when handling high mobility scenarios of the UE. However, for devices that have a relatively short range and low mobility (e.g., CIoT users), many of the pilot symbols useful for high mobility UEs can be redundant for CIoT devices. Since LTE systems are generally designed to handle a worst case scenario, bandwidth can sometimes be wasted. Furthermore, blind repetition and spreading can be utilized on top of current commercial systems to extend coverage for CIoT devices, which translates to additional power consumption at the CIoT device. Therefore, reducing the density of the reference signals (or pilot symbols) can improve spectral efficiency, thereby extending the battery life of the CIoT device.

Figure 3:
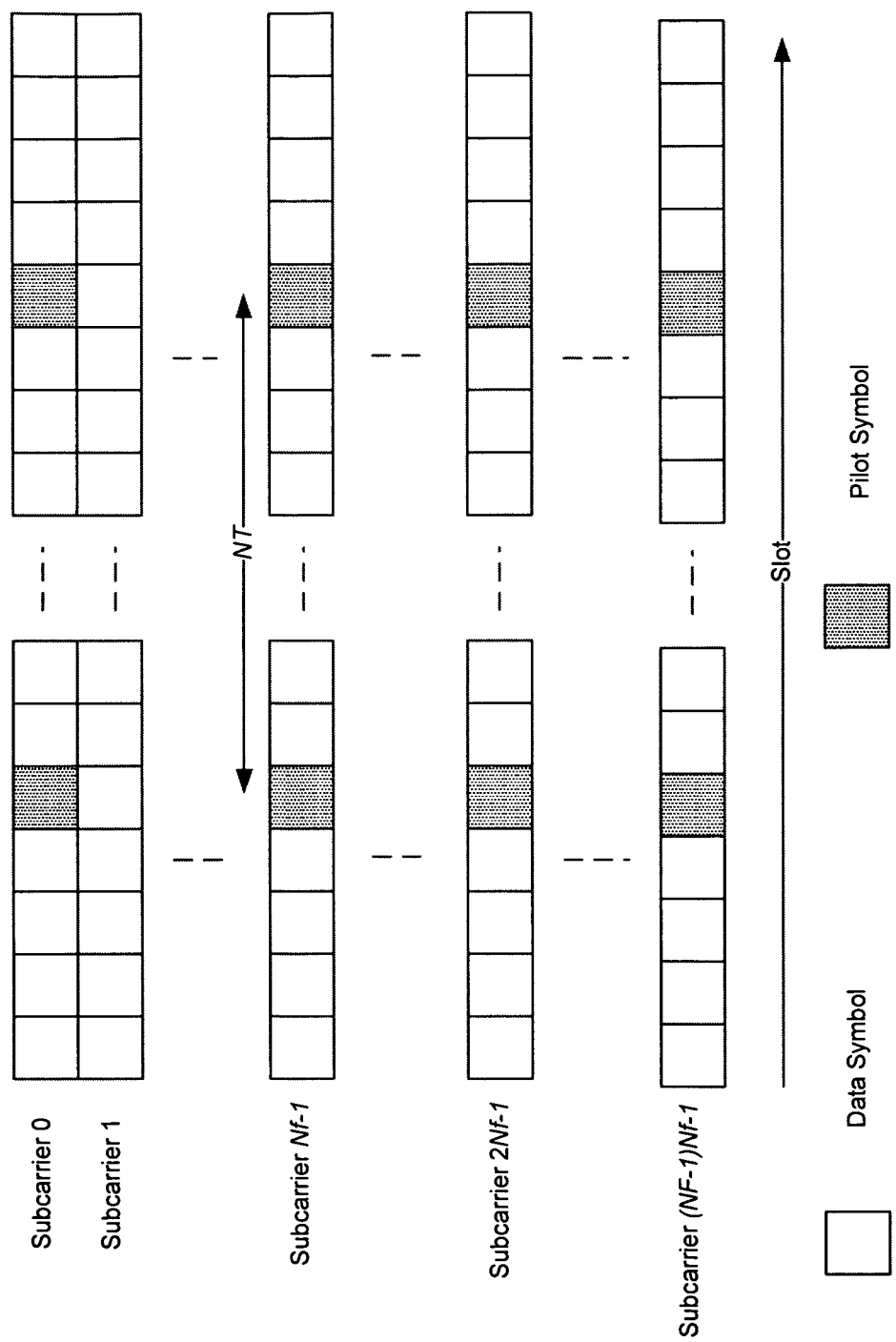
FIG. 3 illustrates a pre-configured downlink reference signal pattern in accordance with an example.

FIG. 3 illustrates an exemplary pre-configured downlink reference signal pattern. Similar to the downlink reference signal pattern shown in FIG. 2, reference signals (or pilot symbols) can be inserted every $N_f$ subcarriers, and within a particular subcarrier, a reference signal (or pilot signal) can be inserted every $N_t$ symbols. In one example, the pilot symbol spacing parameters of $N_t$ and $N_f$ can be configured based on a number of usable subcarriers of an OFDM symbol, wireless channel characteristics, and an expected mobility of the UE. In other words, $N_t$ and $N_f$ are configurable parameters that can vary depending on the various factors described above.

In the example shown in FIG. 3, subcarrier 0 can include two pilot symbols in a slot, wherein the two pilot symbols are separated in accordance with $N_t$, which is a configurable parameter. In addition, in this example, subcarrier 1 does not include any pilot symbols. Rather, the subsequent subcarrier with one or more pilot symbols is subcarrier $N_f-1$. The two pilot symbols in subcarrier $N_f-1$ can be inserted in positions that correspond to the positions in subcarrier 0 in which the two pilot symbols are inserted. Similarly, the subsequent subcarriers with one or more pilot symbols are subcarriers $2N_f-1$ and $(N_F-1)N_f-1$, and the pilot symbols can be inserted in positions that correspond to the positions in the previous subcarriers in which the two pilot symbols are inserted.

In one configuration, according to a separability property of the correlation function in: $r_H(n,k)=r_t(n)\cdot r_f(k)$, a one two-dimensional channel estimation can be replaced by two one-dimensional channel estimators to reduce the computational complexity at the receiver (e.g., the CIoT device). For example, if channel estimation is first performed in the time domain, the number of channel estimation processes to be utilized is the sum of the number of assigned subcarriers with pilot symbols in the frequency and time domains, respectively, e.g., 2 or 4, and $N_S$, wherein $N_S$ is the number of OFDM symbols in a scheduling interval (as shown in FIG. 2). The number of channel estimation in the time domain can depend on the number of assigned subcarriers. Alternatively, if channel estimation is first performed in the frequency domain, the number of channel estimation processes is the sum of the number of pilot symbols in the time domain $N_T$ and the number of available subcarriers in one scheduling period, wherein $N_T$ is the number of pilot signals in one subcarrier. In one example, when the reference signals are inserted only into specific OFDM symbols (as shown in FIG. 3), the number of channel estimation processes can be the sum of $N_T$ and the number of allocated subcarriers in the frequency and time domains, respectively.

In one configuration, the reference signals (or pilot symbols) can be transmitted with a higher power as compared to the data signals (or data symbols) in order to improve a channel estimation quality. In some cases, reference signals from different cells can collide, and then this power boost on the reference signals may not be beneficial. However, this problem can be mitigated by randomizing a location of the cell-specific reference signals based on a cell identifier (ID), and therefore, co-channel interference on the reference signals can be minimized.

In one configuration, since CIoT networks are expected to support a large number of CIoT devices, CIoT devices with various characteristics (or CIoT devices associated with different coverage classes) can coexist within a cell coverage area. In this case, when the CIoT networks are designed to properly handle extreme cases (e.g., high mobility CIoT devices, low mobility CIoT devices, a relatively large wireless channel delay spread, a relatively small wireless channel delay spread), the corresponding number of reference signals (or pilot signals) for the CIoT devices can be more than or less than sufficient. For example, if the CIoT network is designed or configured for low device mobility, high device mobility, a small wireless channel delay spread, a large wireless channel delay spread, etc., sometimes such a design or configuration can result in a waste of resources for the reference signals (or pilot symbols) to estimate the wireless channel based on the Nyquist sampling theorem. As an example, for high mobility CIoT devices, a pilot symbol pattern with a spacing of 5 can be sufficient for performing channel estimation, but if a high mobility CIoT device only receives one pilot symbol for every 8 data symbols, then channel estimation at the high mobility CIoT device cannot be guaranteed. On the other hand, a pilot symbol pattern with a spacing of 8 can unnecessarily waste resources for low mobility CIoT devices.

Therefore, downlink reference signal patterns (or pilot symbol patterns) can be dynamic to handle different device coverage classes, as opposed to static reference signal patterns (or pilot symbol patterns) that do not consider a coverage class associated with a particular CIoT device. For example, the reference signal pattern (or pilot symbol pattern) can be relatively dense for a first coverage class, but relatively sparse for a second coverage class. Certain CIoT devices can be included in a coverage class that corresponds to the CIoT devices' characteristics. For example, low mobility CIoT devices can be associated with a low mobility coverage class, and therefore, the reference signal pattern (or pilot symbol pattern) for the low mobility CIoT devices can be relatively sparse (i.e., the pattern has a reduced number of pilot symbols). As another example, high mobility CIoT devices can be associated with a high mobility coverage class, and therefore, the reference signal pattern (or pilot symbol pattern) for the high mobility CIoT devices can be relatively dense (i.e., the pattern has an increased number of pilot symbols).

Figure 4:
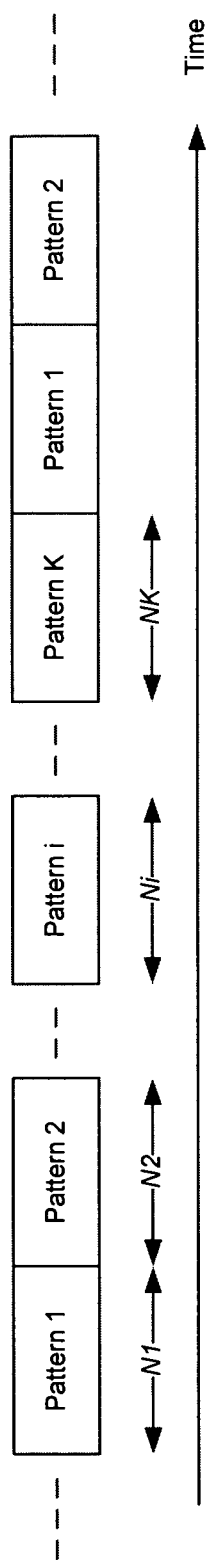
FIG. 4 illustrates a dynamic downlink reference signal pattern that utilizes time division multiplexing (TDM) in accordance with an example.

FIG. 4 illustrates an exemplary dynamic downlink reference signal pattern that utilizes time division multiplexing (TDM). As shown in FIG. 4, pattern 1, pattern 2 and pattern K can be repeated in a TDM manner. The reference signal patterns (or pilot symbol patterns) can be dynamic based on a corresponding coverage class. As previously explained, different coverage classes can be formed based on low device mobility, high device mobility, a small wireless channel delay spread, a large wireless channel delay spread, other wireless channel characteristics, etc. Therefore, depending on a device's coverage class, different pilot symbol patterns with different pilot symbol densities can be configured in a TDM manner.

As an example, a selected number of reference signal patterns (or pilot symbol patterns) can be defined for a given number of device coverage classes. For example, for K device coverage classes, there can be K reference signal patterns, wherein K is an integer. As a non-limiting example, 5 reference signal patterns can be defined for 10 device coverage classes, as coverage classes 0 and 1 can be associated with reference signal pattern 1, and coverage classes 2, 3 and 4 can be associated with reference signal pattern 2, and so on. As another example, reference signal pattern 1 can be relatively sparse due to its correspondence to a low mobility coverage class, whereas reference signal pattern 2 can be relatively dense due to its correspondence to a high mobility coverage class.

With respect to dynamic reference signal (or pilot symbol) patterns, either TDM or frequency division multiplexing (FDM) can be utilized. However, for CIoT systems, a FDM approach may be less efficient as compared to a TDM approach since the number of available subcarriers in the frequency domain is relatively small due to the narrowband characteristics in the current CIoT systems. Furthermore, due to less stringent latency restrictions and short packet transmissions, the TDM approach can be better suited for CIoT systems.

As shown in FIG. 4, $N_i$ is a duration of a pilot pattern i at a base station. The duration can be one or more subframes, or a frame duration in narrow band (NB) OFDMA systems. In NB-OFDMA, the duration of a sub-frame and a frame are 160 milliseconds (ms) and 1.28 seconds (s), respectively. In one example, with respect to three partitions, i.e., K=3, the TDM patterns can be implemented for low-mobility CIoT devices, medium-mobility CIoT devices, and high-mobility CIoT devices.

In one example, when the pilot symbol pattern i is designed based on the coverage class, a time duration of blind repetitions or spreading (which consumes a greater amount of the available resources) can be considered for the duration of the pilot symbol pattern where the CIoT devices at the extended coverage are efficiently served. In addition, by assigning resources in the different scheduling periods to the CIoT devices with different coverage class, a starvation of the normal coverage devices (e.g., UEs that perform voice calls) can be minimized.

In one example, for sparse pilot symbol patterns, subsampled reference signal patterns (or pilot symbol patterns) from a more dense pattern can be used to reduce battery consumption and computational complexity at a receiver of the CIoT device. For example, a dense pilot pattern with a total of N pilot signals can be associated with a certain location, and a fraction of the N pilot signals can be selected for a less dense pilot pattern. As another example, every other pilot signal can be chosen from the N pilot signals, and then N/2 pilot signals can be used for the less dense pattern. Furthermore, based on a nesting property, every 4th pilot signal can be selected for the next pilot pattern and so on.

In one configuration, a transmitter (e.g., a base station) can transmit a set of common reference signals to a receiver (e.g., a CIoT device). The set of common reference signals can include a set of pilot symbols. The transmitter can transmit the set of common reference signals in order to facilitate the coherent detection of the transmitted signals and channel estimation or measurements at the receiver.

In one configuration, the set of common reference signals can be inserted in a cell-specific manner, and a cell specific shift in a frequency domain can function to avoid reference signal collisions (or pilot symbol collisions) from different cells.

In one configuration, the patterns associated with the set of common reference signals can be determined by a coverage class of the CIoT devices, a mobility level of the CIoT devices and/or characteristics of the wireless channels.

In one configuration, the transmitter (e.g., the based station) can configure the set of reference signals in a static manner or dynamic manner. In addition, a density of reference signals (or pilot symbols) in the control channel can be higher than as compared to the data channel in order to maintain a suitable level of error performance.

In one configuration, a dynamic pattern of reference signals (or pilot symbols) can be determined by the coverage class of the CIoT devices, a mobility level of the CIoT devices and/or wireless channel characteristics. In one example, the dynamic pattern of reference signals can utilize time division multiplexing (TDM) or frequency division multiplexing (FDM). In one example, a duration of each pilot pattern ($N_i$) and a number of patterns (K) can be pre-determined or a configurable parameter. In one example, when ($N_i$) and (K) are configurable parameters, the duration of each pilot pattern ($N_i$) and the number of patterns (K) can be broadcasted via a broadcast channel. In one example, when ($N_i$) and (K) are configurable parameters, the duration of each pilot pattern ($N_i$) and the number of patterns (K) can be sent via higher layer signaling.

In one example, a sparse pilot pattern can be a sub-sampled pattern of a dense pilot pattern. For example, a nesting property or a subset of the dense pilot pattern can be utilized, thereby reducing the computational complexity at the receiver (e.g., the CIoT device).

In one configuration, when an entire bandwidth can be partitioned into multiple segments, FDM patterns can be implemented in a manner similar to those in TDM.

Figure 5:
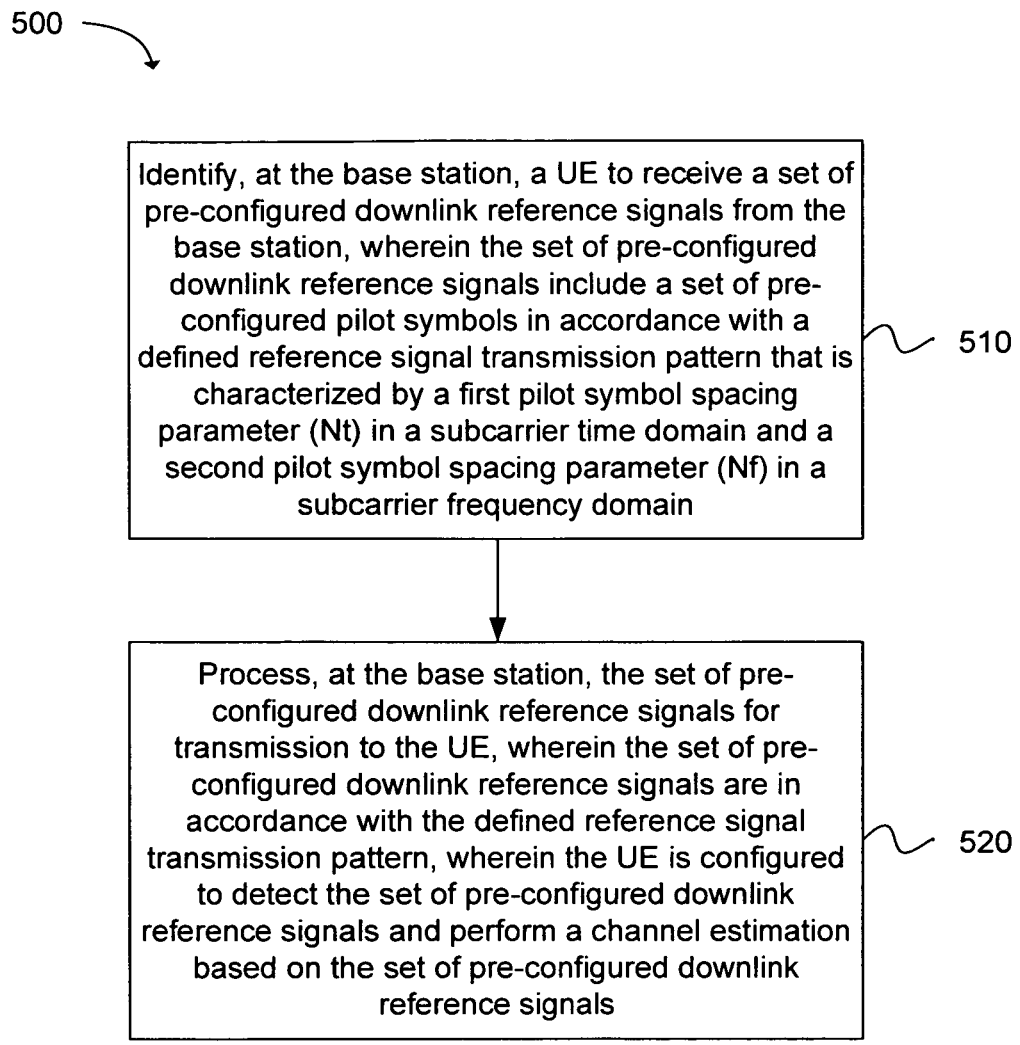
FIG. 5 depicts functionality of a base station operable to transmit downlink reference signals to user equipments (UEs) in accordance with an example.

Another example provides functionality 500 of a base station operable to transmit downlink reference signals to user equipments (UEs), as shown in the flow chart in FIG. 5. The base station can comprise one or more processors and memory configured to: identify, at the base station, a UE to receive a set of pre-configured downlink reference signals from the base station, wherein the set of pre-configured downlink reference signals include a set of pre-configured pilot symbols in accordance with a defined reference signal transmission pattern that is characterized by a first pilot symbol spacing parameter ($N_t$) in a subcarrier time domain and a second pilot symbol spacing parameter ($N_f$) in a subcarrier frequency domain, as in block 510. The base station can comprise one or more processors and memory configured to: process, at the base station, the set of pre-configured downlink reference signals for transmission to the UE, wherein the set of pre-configured downlink reference signals are in accordance with the defined reference signal transmission pattern, wherein the UE is configured to detect the set of pre-configured downlink reference signals and perform a channel estimation based on the set of pre-configured downlink reference signals, as in block 520.

Figure 6:
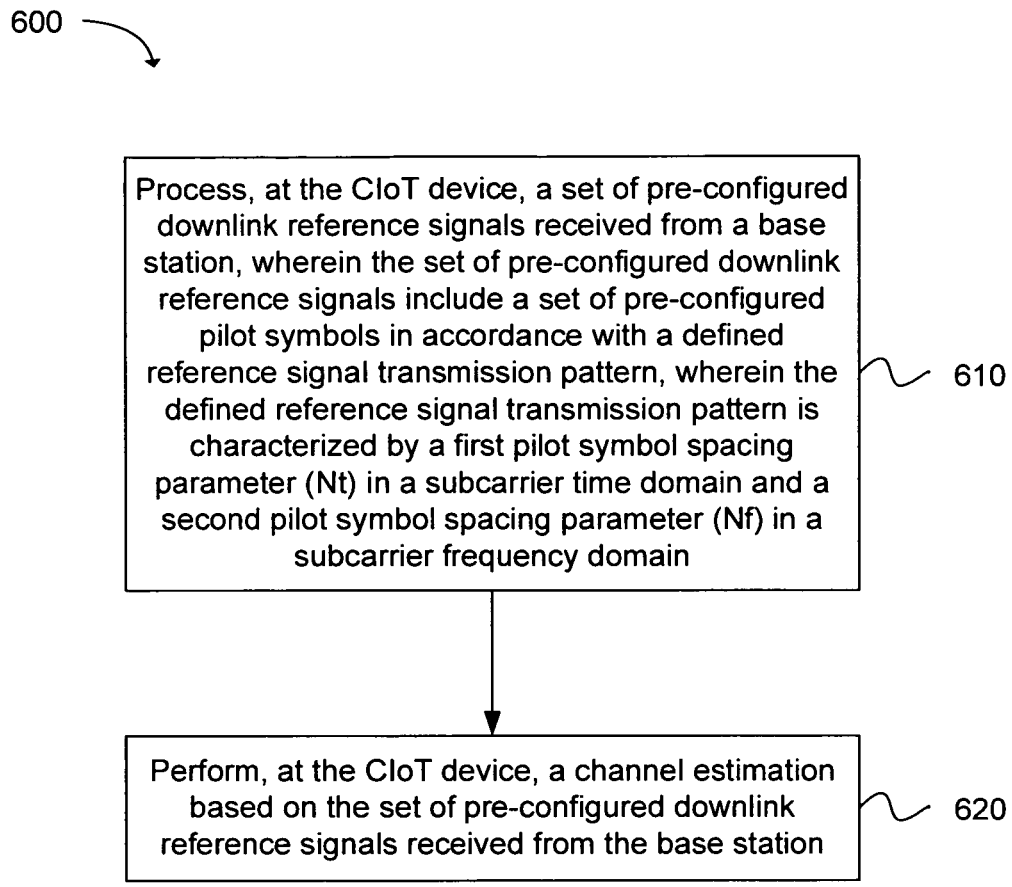
FIG. 6 depicts functionality of a cellular Internet of Things (CIoT) device operable to perform channel estimation based on downlink reference signals in accordance with an example.

Another example provides functionality 600 of a cellular Internet of Things (CIoT) device operable to perform channel estimation based on downlink reference signals, as shown in the flow chart in FIG. 6. The CIoT device can comprise one or more processors and memory configured to: process, at the CIoT device, a set of pre-configured downlink reference signals received from a base station, wherein the set of pre-configured downlink reference signals include a set of pre-configured pilot symbols in accordance with a defined reference signal transmission pattern, wherein the defined reference signal transmission pattern is characterized by a first pilot symbol spacing parameter ($N_t$) in a subcarrier time domain and a second pilot symbol spacing parameter ($N_f$) in a subcarrier frequency domain, as in block 610. The CIoT device can comprise one or more processors and memory configured to: perform, at the CIoT device, a channel estimation based on the set of pre-configured downlink reference signals received from the base station, as in block 620.

Figure 7:
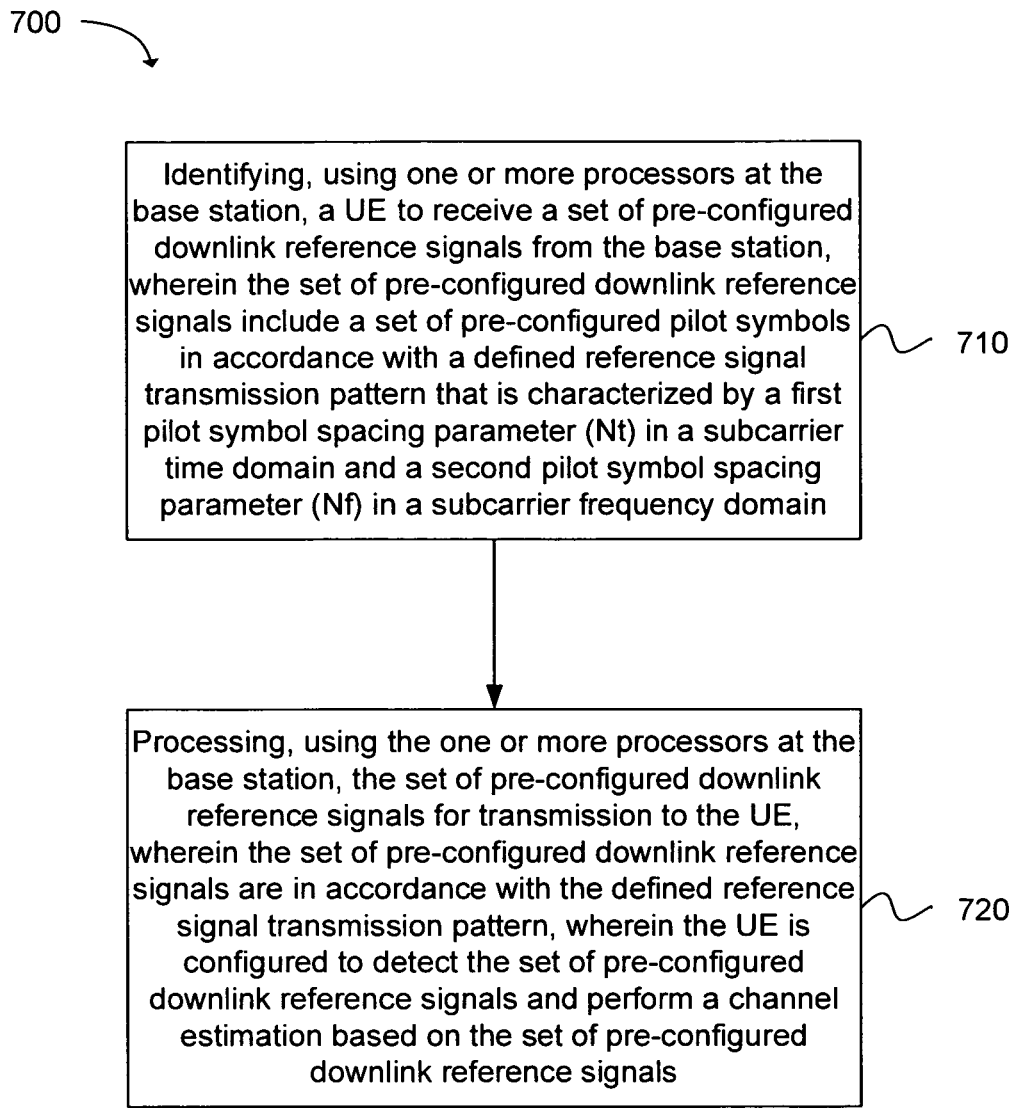
FIG. 7 depicts a flowchart of a machine readable storage medium having instructions embodied thereon for transmitting downlink reference signals from a base station to user equipments (UEs) in accordance with an example.

Another example provides at least one machine readable storage medium having instructions 700 embodied thereon for transmitting downlink reference signals from a base station to user equipments (UEs), as shown in the flow chart in FIG. 7. The instructions can be executed on a machine, where the instructions are included on at least one computer readable medium or one non-transitory machine readable storage medium. The instructions when executed perform: identifying, using one or more processors at the base station, a UE to receive a set of pre-configured downlink reference signals from the base station, wherein the set of pre-configured downlink reference signals include a set of pre-configured pilot symbols in accordance with a defined reference signal transmission pattern that is characterized by a first pilot symbol spacing parameter ($N_t$) in a subcarrier time domain and a second pilot symbol spacing parameter ($N_f$) in a subcarrier frequency domain, as in block 710. The instructions when executed perform: processing, using the one or more processors at the base station, the set of pre-configured downlink reference signals for transmission to the UE, wherein the set of pre-configured downlink reference signals are in accordance with the defined reference signal transmission pattern, wherein the UE is configured to detect the set of pre-configured downlink reference signals and perform a channel estimation based on the set of pre-configured downlink reference signals, as in block 720.

Figure 8:
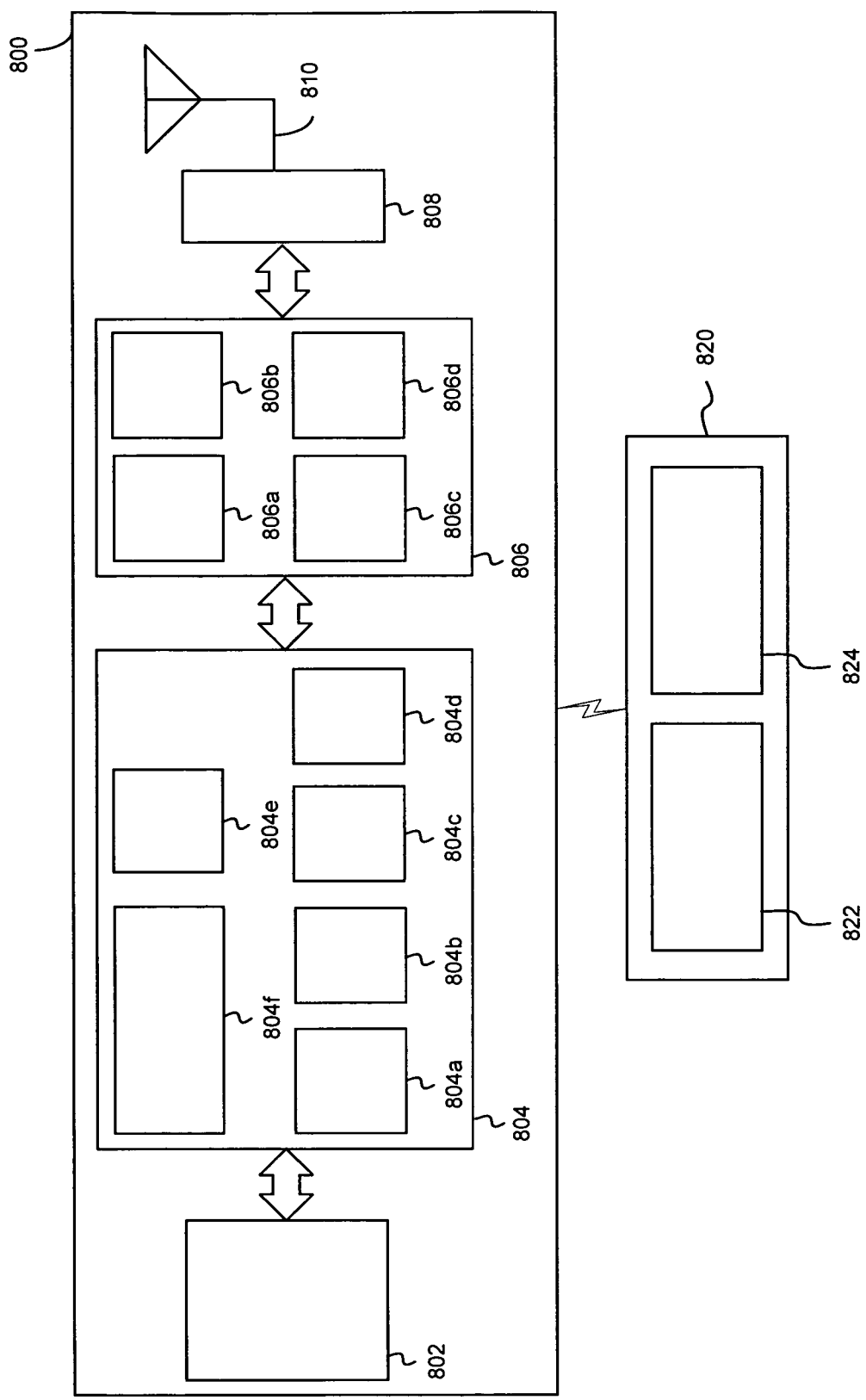
FIG. 8 illustrates a diagram of a wireless device (e.g., UE) in accordance with an example.

FIG. 8 provides an example illustration of a user equipment (UE) device 800, such as a wireless device, a mobile station (MS), a mobile wireless device, a mobile communication device, a tablet, a handset, or other type of wireless device. The UE device 800 can include one or more antennas configured to communicate with a node 820 or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The node 820 can include one or more processors 822 and memory 824. The UE device 800 can be configured to communicate using at least one wireless communication standard including 3GPP LTE, WiMAX, High Speed Packet Access (HSPA), Bluetooth, and WiFi. The UE device 800 can communicate using separate antennas for each wireless communication standard or shared antennas for multiple wireless communication standards. The UE device 800 can communicate in a wireless local area network (WLAN), a wireless personal area network (WPAN), and/or a WWAN.

In some embodiments, the UE device 800 may include application circuitry 802, baseband circuitry 804, Radio Frequency (RF) circuitry 806, front-end module (FEM) circuitry 808 and one or more antennas 810, coupled together at least as shown.

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium, and may be configured to execute instructions stored in the storage medium to enable various applications and/or operating systems to run on the system.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804*a*, third generation (3G) baseband processor 804*b*, fourth generation (4G) baseband processor 804*c*, and/or other baseband processor(s) 804*d* for other existing generations, generations in development or to be developed in the future (e.g., fifth generation (5G), 6G, etc.). The baseband circuitry 804 (e.g., one or more of baseband processors 804*a*-*d*) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804*e* of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804*f*. The audio DSP(s) 804*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

The RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806a, amplifier circuitry 806b and filter circuitry 806c. The transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c. The filter circuitry 806c may include a low-pass filter (LPF), although the scope of the embodiments is not limited in this respect.

In some embodiments, the mixer circuitry 806a of the receive signal path and the mixer circuitry 806a of the transmit signal path may include two or more mixers and may be arranged for quadrature down-conversion and/or up-conversion respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct down-conversion and/or direct up-conversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO). Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810.

Figure 9:
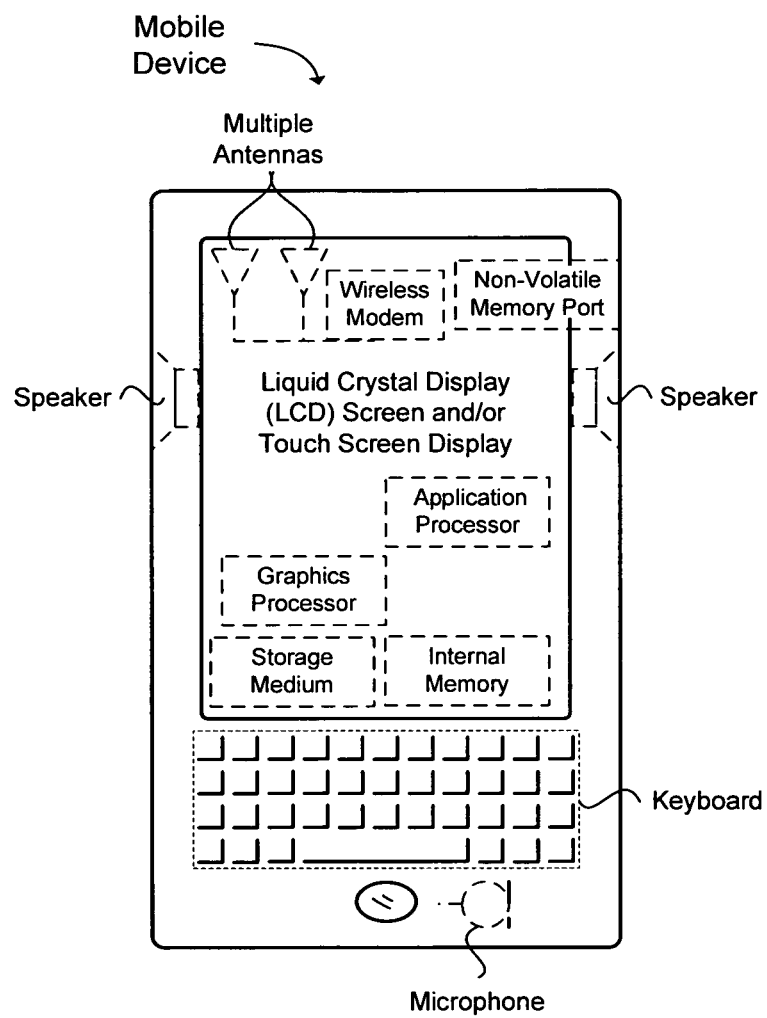
FIG. 9 illustrates a diagram of a wireless device (e.g., UE) in accordance with an example.

FIG. 9 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 9 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a base station operable to transmit downlink reference signals to user equipments (UEs), the apparatus comprising one or more processors and memory configured to: identify, at the base station, a UE to receive a set of pre-configured downlink reference signals from the base station, wherein the set of pre-configured downlink reference signals include a set of pre-configured pilot symbols in accordance with a defined reference signal transmission pattern that is characterized by a first pilot symbol spacing parameter ($N_t$) in a subcarrier time domain and a second pilot symbol spacing parameter ($N_f$) in a subcarrier frequency domain; and process, at the base station, the set of pre-configured downlink reference signals for transmission to the UE, wherein the set of pre-configured downlink reference signals are in accordance with the defined reference signal transmission pattern, wherein the UE is configured to detect the set of pre-configured downlink reference signals and perform a channel estimation based on the set of pre-configured downlink reference signals.

Example 2 includes the apparatus of Example 1, wherein the first pilot symbol spacing parameter ($N_t$) and the second pilot symbol spacing parameter ($N_f$) are configurable parameters that depend on at least one of: a number of usable subcarriers in an orthogonal frequency division multiplexing (OFDM) symbol, wireless channel characteristics, and an expected mobility level of the UE, wherein the second pilot symbol spacing parameter ($N_f$) is equal to a value of at least one.

Example 3 includes the apparatus of any of Examples 1-2, wherein the defined reference signal transmission pattern is a static reference signal transmission pattern.

Example 4 includes the apparatus of any of Examples 1-3, wherein the defined reference signal transmission pattern is a dynamic reference signal transmission pattern with a defined pilot symbol density level depending on one or more wireless channel characteristics and a coverage class associated with the UE, wherein the coverage class for the UE is selected based on at least one of a UE mobility level or a wireless channel delay spread of the UE.

Example 5 includes the apparatus of any of Examples 1-4, wherein the defined reference signal transmission pattern is a dynamic reference signal transmission pattern that utilizes time division multiplexing (TDM) or frequency division multiplexing (FDM).

Example 6 includes the apparatus of any of Examples 1-5, wherein the defined reference signal transmission pattern is a dynamic reference signal transmission pattern that is characterized by a defined duration ($N_t$) and is included in a defined number of reference signal transmission patterns (K), wherein $N_i$ and K are predefined parameters or configurable parameters, wherein $N_i$ and K are communicated from the base station to the UE via a broadcast channel or via higher layer signaling.

Example 7 includes the apparatus of any of Examples 1-6, wherein the set of pre-configured downlink reference signals include cell-specific common reference signals or UE-specific dedicated reference signals.

Example 8 includes the apparatus of any of Examples 1-7, wherein: the first pilot symbol spacing parameter ($N_t$) is defined by: $N_t<1/(2f_{d,max}T_s)$, wherein $N_t$ is a defined number of data symbols between two pilot symbols in a time domain, $f_{d,max}$ is a maximum Doppler frequency, and $T_s$ is an orthogonal frequency division multiplexing (OFDM) symbol duration; and the second pilot symbol spacing parameter ($N_f$) is defined by: $N_f<N/L$, wherein $N_f$ is a defined number of data symbols between two pilot symbols in a frequency domain, N is a number of available subcarriers in an OFDM symbol, and L is a number of multipaths of wireless channels.

Example 9 includes the apparatus of any of Examples 1-8, wherein one or more downlink reference signals in the set of pre-configured downlink reference signals are shifted in a frequency domain to avoid pilot symbol collisions between two or more cells.

Example 10 includes the apparatus of any of Examples 1-9, wherein the defined reference signal transmission pattern is characterized by a first pilot symbol density level for control channel estimation and a second pilot symbol density level for data channel estimation, wherein the first pilot symbol density level is greater than the second pilot symbol density level.

Example 11 includes the apparatus of any of Examples 1-10, further comprising: an application processor configured to identify the UE to receive the set of pre-configured downlink reference signals from the base station; and a baseband processor configured to process the set of pre-configured downlink reference signals for transmission to the UE.

Example 12 includes an apparatus of a cellular Internet of Things (CIoT) device operable to perform channel estimation based on downlink reference signals, the apparatus comprising one or more processors and memory configured to: process, at the CIoT device, a set of pre-configured downlink reference signals received from a base station, wherein the set of pre-configured downlink reference signals include a set of pre-configured pilot symbols in accordance with a defined reference signal transmission pattern, wherein the defined reference signal transmission pattern is characterized by a first pilot symbol spacing parameter ($N_t$) in a subcarrier time domain and a second pilot symbol spacing parameter ($N_f$) in a subcarrier frequency domain; and perform, at the CIoT device, a channel estimation based on the set of pre-configured downlink reference signals received from the base station.

Example 13 includes the apparatus of Example 12, wherein the first pilot symbol spacing parameter ($N_t$) and the second pilot symbol spacing parameter ($N_f$) are configurable parameters that depend on at least one of: a number of usable subcarriers in an orthogonal frequency division multiplexing (OFDM) symbol, wireless channel characteristics, and an expected mobility level of the CIoT device.

Example 14 includes the apparatus of any of Examples 12-13, wherein the defined reference signal transmission pattern is a static reference signal transmission pattern.

Example 15 includes the apparatus of any of Examples 12-14, wherein the defined reference signal transmission pattern is a dynamic reference signal transmission pattern with a defined pilot symbol density level depending on one or more wireless channel characteristics and a coverage class associated with the CIoT device, wherein the coverage class for the CIoT device is selected based on at least one of a CIoT device mobility level or a wireless channel delay spread of the CIoT device.

Example 16 includes the apparatus of any of Examples 12-15, wherein the defined reference signal transmission pattern is a dynamic reference signal transmission pattern that utilizes time division multiplexing (TDM) or frequency division multiplexing (FDM).

Example 17 includes the apparatus of any of Examples 12-16, wherein the defined reference signal transmission pattern is a dynamic reference signal transmission pattern that is characterized by a defined duration ($N_t$) and is included in a defined number of reference signal transmission patterns (K), wherein $N_i$ and K are predefined parameters or configurable parameters, wherein $N_i$ and K are communicated from the base station to the CIoT device via a broadcast channel or via higher layer signaling.

Example 18 includes the apparatus of any of Examples 12-17, wherein the set of pre-configured downlink reference signals include cell-specific common reference signals or dedicated reference signals.

Example 19 includes the apparatus of any of Examples 12-18, wherein: the first pilot symbol spacing parameter ($N_t$) is defined by: $N_t<1/(2f_{d,max}T_s)$, wherein $N_t$ is a defined number of data symbols between two pilot symbols in a time domain, $f_{d,max}$ is a maximum Doppler frequency, and $T_s$ is an orthogonal frequency division multiplexing (OFDM) symbol duration; and the second pilot symbol spacing parameter ($N_f$) is defined by: $N_f<N/L$, wherein $N_f$ is a defined number of data symbols between two pilot symbols in a frequency domain, N is a number of available subcarriers in an OFDM symbol, and L is a number of multipaths of wireless channels.

Example 20 includes the apparatus of any of Examples 12-19, wherein one or more downlink reference signals in the set of pre-configured downlink reference signals are shifted in a frequency domain to avoid pilot symbol collisions between two or more cells.

Example 21 includes the apparatus of any of Examples 12-20, wherein the defined reference signal transmission pattern is characterized by a first pilot symbol density level for control channel estimation and a second pilot symbol density level for data channel estimation, wherein the first pilot symbol density level is greater than the second pilot symbol density level.

Example 22 includes the apparatus of any of Examples 12-21, wherein the CIoT device includes at least one of an antenna, a touch sensitive display screen, a speaker, a microphone, a graphics processor, an application processor, a baseband processor, an internal memory, a non-volatile memory port, and combinations thereof.

Example 23 includes at least one machine readable storage medium having instructions embodied thereon for transmitting downlink reference signals from a base station to user equipments (UEs), the instructions when executed perform the following: identifying, using one or more processors at the base station, a UE to receive a set of pre-configured downlink reference signals from the base station, wherein the set of pre-configured downlink reference signals include a set of pre-configured pilot symbols in accordance with a defined reference signal transmission pattern that is characterized by a first pilot symbol spacing parameter ($N_t$) in a subcarrier time domain and a second pilot symbol spacing parameter ($N_f$) in a subcarrier frequency domain; and processing, using the one or more processors at the base station, the set of pre-configured downlink reference signals for transmission to the UE, wherein the set of pre-configured downlink reference signals are in accordance with the defined reference signal transmission pattern, wherein the UE is configured to detect the set of pre-configured downlink reference signals and perform a channel estimation based on the set of pre-configured downlink reference signals.

Example 24 includes the at least one machine readable storage medium of Example 23, wherein the defined reference signal transmission pattern is a dynamic reference signal transmission pattern with a defined pilot symbol density level depending on one or more wireless channel characteristics and a coverage class associated with the UE, wherein the coverage class for the UE is selected based on at least one of a UE mobility level or a wireless channel delay spread of the UE.

Example 25 includes the at least one machine readable storage medium of any of Examples 23-24, wherein the defined reference signal transmission pattern is a dynamic reference signal transmission pattern that is characterized by a defined duration ($N_i$) and is included in a defined number of reference signal transmission patterns (K), wherein $N_i$ and K are predefined parameters or configurable parameters, wherein $N_i$ and K are communicated from the base station to the UE via a broadcast channel or via higher layer signaling.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a base station operable to encode downlink narrowband reference signals for transmission on a wireless channel, the apparatus comprising:
   one or more processors configured to:
      map, at the base station, a set of downlink narrowband reference signals to resources in accordance with a parameter that defines a cell-specific frequency shift for different downlink narrowband references signals in a frequency domain, and a time shift for different downlink narrowband references signals in a time domain,
      wherein the parameter that defines the cell-specific frequency shift and the time shift:
         is configurable at the base station based on a number of usable subcarriers of an Orthogonal Frequency Division Multiplexing symbol of the wireless channel;
         is based on a cell identity; and
         is to define a position for the different downlink narrowband reference signals in the frequency domain; and
      encode, at the base station, the set of downlink narrowband reference signals for transmission to a plurality of user equipment (UEs) using mapped resources of the wireless channel based on the parameter; and
   memory configured to store the parameter that defines the cell-specific frequency shift for different downlink narrowband references signals in the frequency domain.

2. The apparatus of claim 1, further comprising a transceiver configured to transmit the set of downlink narrowband reference signals to the plurality of UEs.

3. The apparatus of claim 1, wherein the mapped resources include a set of symbols.

4. An apparatus of a user equipment (UE) operable to decode downlink narrowband reference signals received from a base station on a wireless channel, the apparatus comprising:
   one or more processors configured to:
      decode, at the UE, a set of downlink narrowband reference signals received from the base station, wherein the set of downlink narrowband reference signals is mapped to resources in accordance with a parameter that defines a cell-specific frequency shift for different downlink narrowband references signals in a frequency domain, and a time shift for different downlink narrowband references signals in a time domain,
      wherein the parameter that defines the cell-specific frequency shift and the time shift:
         is configurable at the base station based on a number of usable subcarriers of an Orthogonal Frequency Division Multiplexing symbol of the wireless channel;
         is based on a cell identity; and
         is to define a position for the different downlink narrowband reference signals in the frequency domain; and
      estimate, at the UE, a channel based on the set of downlink narrowband reference signals received from the base station of the wireless channel; and
   memory configured to store the parameter that defines the cell-specific frequency shift for different downlink narrowband references signals in the frequency domain.

5. The apparatus of claim 4, further comprising a transceiver configured to receive the set of downlink narrowband reference signals from the base station.

6. The apparatus of claim 4, wherein the set of downlink narrowband reference signals received from the base station includes a set of pilot symbols.

7. The apparatus of claim 4, wherein the set of downlink narrowband reference signals is received from the base station using a selected subset of subcarriers in accordance with the parameter that defines the cell-specific frequency shift.

8. The apparatus of claim 4, wherein the UE is configured for narrowband cellular Internet of Things (CIoT).

9. At least one non-transitory machine readable storage medium comprising instructions embodied thereon for encoding downlink narrowband reference signals for transmission from a base station on a wireless channel, the instructions when executed by one or more processors cause the base station to perform the following:
   mapping, at the base station, a set of downlink narrowband reference signals to resources in accordance with a parameter that defines a cell-specific frequency shift for different downlink narrowband references signals in a frequency domain, and a time shift for different downlink narrowband references signals in a time domain,
      wherein the parameter that defines the cell-specific frequency shift and the time shift:
         is configurable at the base station based on a number of usable subcarriers of an Orthogonal Frequency Division Multiplexing symbol of the wireless channel;
         is based on a cell identity; and
         is to define a position for the different downlink narrowband reference signals in the frequency domain; and
   encoding, at the base station, the set of downlink narrowband reference signals for transmission to a plurality of user equipment (UEs) using mapped resources of the wireless channel based on the parameter.

10. The at least one non-transitory machine readable storage medium of claim 9, wherein the mapped resources include a set of symbols.

11. The at least one non-transitory machine readable storage medium of claim 9, wherein the base station is configured for narrowband cellular Internet of Things (CIoT).

12. At least one non-transitory machine readable storage medium comprising instructions embodied thereon for decoding downlink narrowband reference signals received from a base station on a wireless channel at a user equipment (UE), the instructions when executed by one or more processors cause the UE to perform the following:

decoding, at the UE, a set of downlink narrowband reference signals received from the base station, wherein the set of downlink narrowband reference signals is mapped to resources in accordance with a parameter that defines a cell-specific frequency shift for different downlink narrowband references signals in a frequency domain, and a time shift for different downlink narrowband references signals in a time domain, wherein the parameter that defines the cell-specific frequency shift and the time shift:

is configurable at the base station based on a number of usable subcarriers of an Orthogonal Frequency Division Multiplexing symbol of the wireless channel;

is based on a cell identity; and is to define a position for the different downlink narrowband reference signals in the frequency domain; and estimating, at the UE, a channel based on the set of downlink narrowband reference signals received from the base station.

13. The at least one non-transitory machine readable storage medium of claim 12, wherein the set of downlink narrowband reference signals received from the base station includes a set of pilot symbols.

14. The at least one non-transitory machine readable storage medium of claim 12, wherein the set of downlink narrowband reference signals is received from the base station using a selected subset of subcarriers in accordance with the parameter that defines the cell-specific frequency shift.

15. The at least one non-transitory machine readable storage medium of claim 12, wherein the UE is configured for narrowband cellular Internet of Things (CIoT).

* * * * *